(12) United States Patent
Loehr et al.

(10) Patent No.: US 9,016,049 B2
(45) Date of Patent: Apr. 28, 2015

(54) METHOD FOR CONTROLLING AN INTERNAL COMBUSTION ENGINE IN CONNECTION WITH AN EXOTHERMAL REGENERATION OF AN EXHAUST GAS AFTERTREATMENT COMPONENT

(75) Inventors: Matthias Loehr, Troistedt (DE); Stefan Scherer, Stuttgart (DE); Wolfram Faas, Weinstadt (DE); Rolf-Dieter Koch, Ditzingen (DE); Holger Ziegler, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 1253 days.

(21) Appl. No.: 12/889,161

(22) Filed: Sep. 23, 2010

(65) Prior Publication Data

US 2011/0072785 A1    Mar. 31, 2011

(30) Foreign Application Priority Data

Sep. 29, 2009  (DE) .......................... 10 2009 045 088

(51) Int. Cl.
*F01N 3/18* (2006.01)
*F01N 9/00* (2006.01)
*F01N 3/08* (2006.01)
*F02D 41/02* (2006.01)
*F02D 41/14* (2006.01)

(52) U.S. Cl.
CPC ................ *F01N 9/00* (2013.01); *F01N 3/0814* (2013.01); *F01N 3/0842* (2013.01); *F01N 3/0871* (2013.01); *F01N 2430/00* (2013.01); *F01N 2900/1602* (2013.01); *F02D 41/027* (2013.01); *F02D 41/1446* (2013.01); *F02D 41/1454* (2013.01); *F02D 2041/0265* (2013.01); *F02D 2200/0802* (2013.01); *F02D 2200/0804* (2013.01); *Y02T 10/47* (2013.01)

(58) Field of Classification Search
USPC ............................ 60/274, 286, 295, 301, 303
See application file for complete search history.

(56) References Cited

U.S. PATENT DOCUMENTS

| 7,137,248 | B2 | 11/2006 | Schaller | |
|---|---|---|---|---|
| 2003/0230078 | A1* | 12/2003 | Yahata et al. | 60/295 |
| 2004/0123584 | A1* | 7/2004 | Schaller | 60/274 |
| 2005/0027431 | A1* | 2/2005 | Todoroki et al. | 701/105 |

FOREIGN PATENT DOCUMENTS

| DE | 1010 08 720 | | 9/2002 |
|---|---|---|---|
| JP | 2008180155 | A * | 8/2008 |

* cited by examiner

Primary Examiner — Kenneth Bomberg
Assistant Examiner — Jonathan Matthias
(74) Attorney, Agent, or Firm — Kenyon & Kenyon LLP

(57) ABSTRACT

A method is presented for controlling an internal combustion engine (10), which includes an exhaust gas system (12) having an exhaust gas aftertreatment component (22) that temporarily stores exhaust gas constituents and can be regenerated, wherein an expected value for a temperature of the exhaust gas aftertreatment component (22) is formed as a function of an increase in temperature, which arises as a result of exothermal reactions during the duration of an operating mode (BA2) of the internal combustion engine (10) which is set for the regeneration of said exhaust gas aftertreatment component (22), wherein the expected value is compared with an upper threshold value (T_max) and the control of said internal combustion engine (10) is changed when the threshold value (T_max) is exceeded, such that an expected value formed while taking the changed control into account does not exceed said threshold value (T_max). The method is thereby characterized in that a direction of change of a current temperature of said exhaust gas aftertreatment component (22) is taken into account when forming the expected value.

7 Claims, 3 Drawing Sheets

METHOD FOR CONTROLLING AN INTERNAL COMBUSTION ENGINE IN CONNECTION WITH AN EXOTHERMAL REGENERATION OF AN EXHAUST GAS AFTERTREATMENT COMPONENT

This application is claims benefit of Serial No. 10 2009 045 088.2, filed 29 Sep. 2009 in Germany and which application is incorporated herein by reference. To the extent appropriate, a claim of priority is made to the above disclosed application.

BACKGROUND

The invention relates to a method according to the preamble of claim 1 as well as to a control unit according to the preamble of the independent claim 8. Subject matters of this type are in each case known from the German patent publication DE 101 08 720 A1.

In the case of the exhaust gas aftertreatment of internal combustion engines, exhaust gas aftertreatment components like catalytic converters and filters are increasingly being integrated into the exhaust gas tract. Said exhaust gas aftertreatment components convert or temporarily store undesirable constituents of the exhaust gas, such as, for example, regulated and unregulated air pollutant emissions. Examples of catalytic converters are oxidation catalytic converters or SCR catalytic converters (SCR=selective catalytic reduction). Examples of storage exhaust gas aftertreatment components are particle filters and storage catalytic converters.

Filters and storage catalytic converters are periodically regenerated by a so-called regeneration operation, wherein the quantity of retained material which has been stored is converted into desired constituents of the exhaust gas.

Examples include the particle filter regeneration or the regeneration of a NOx storage catalytic converter. Exhaust gas aftertreatment components also at times store exhaust gas constituents, whose storage is not desired, beside the exhaust gas constituents desired to be stored. A zeolite ceramic substrate, as, for example, a SCR catalytic converter or an oxidation catalytic converter, can thus, for example, store larger quantities of uncombusted hydrocarbons. In these cases, it can also then be advantageous to again remove these constituents from the component in order to prevent a "poisoning" of said component. The storage of sulfur in a NOx storage catalytic converter, which then must be periodically desulfurized, represents a further example of an undesired storage.

A regeneration operation of this type typically takes place when the exhaust gas temperature is raised in order to make the chemical processes possible, which lead to the removal or conversion of the stored material. That equally applies to a desulfurization of a storage catalytic converter as to a regeneration of a particle filter.

In the case of internal combustion engines, which are used in transient operation, as, for example, in motor vehicles, it is particularly difficult when raising the temperature in this manner to hold the temperature, with which the exhaust gas mass flow entered the exhaust gas aftertreatment component, constant within a desired range. As a result, it is particularly critical for components of this type to be held for the most part below a maximum temperature in order to avoid irreversible damage to them.

The avoidance of irreversible damage of this type becomes even more difficult the closer the chemical process has to be moved toward this maximum temperature in order to activate the desired reactions.

An additional difficulty emerges if the regeneration operation is combined with an exothermal reaction in the exhaust gas aftertreatment component. On the one hand, the chemical reaction of the stored material during conversion thereof as well as on the other hand the chemical reaction of exhaust gas constituents of the internal combustion engine during the regeneration operation contributes to this circumstance. A typical example for the chemical reaction of the stored material is the burn off of soot in the particle filter. A typical example of a chemical reaction of an exhaust gas constituent is the reaction of unburned hydrocarbons in the oxidation catalytic converter during the heating mode.

The German patent publication DE 101 08 720 A1 mentioned at the beginning of the application describes an exhaust gas system having a particle filter as the exhaust gas aftertreatment component which temporarily stores and is capable of regenerating exhaust gas constituents. In order to prevent a supercritical heating of the particle filter during regeneration, a calculation of a variable TF takes place, which corresponds to a temperature, which can be achieved by an oxidation of the stored soot particles, which takes place during the regeneration of said particle filter. This variable TF is also designated as the expected temperature in said German patent publication DE 101 08 720 A1 and is compared with a threshold value. If the expected temperature exceeds the threshold value, the oxygen content of the exhaust gas is restricted by interventions into a control system of the internal combustion engine in order to prevent an increase in the temperature of the particle filter to supercritical values.

Said German patent publication DE 101 08 720 A1 thereby depicts a method for controlling an internal combustion engine, which includes an exhaust gas system having an exhaust gas aftertreatment component which temporarily stores and is capable of regenerating exhaust gas constituents. In so doing, the method has the following features: An expected value for a temperature of the exhaust gas aftertreatment component is formed as a function of an increase in temperature, which ensues as a result of exothermal reactions during the duration of an operating mode of the internal combustion engine which is set for regeneration. The expected value is compared with an upper threshold value, and when the threshold value is exceeded the control of said internal combustion engine is changed such that an expected value formed with respect to the changed control does not exceed said threshold value.

In the case of the invention as well as in the case of the technical field according to said German patent publication DE 101 08 720 A1, a distance of the current temperature to a maximally admissible temperature is compared with a predictable increase in temperature, which results from the regeneration taking place exothermally. If the increase in temperature is smaller than the aforementioned distance of the current temperature to a maximally admissible temperature, the regeneration can proceed unchanged. If the increase in temperature is greater than said distance, said increase in temperature is slowed down by interventions into the control system of the internal combustion engine.

SUMMARY

The present invention differs from the technical field in each case by the distinguishing features of the independent claims.

With regard to the aspects of the method, the invention thus provides for a direction of change of a current temperature of the exhaust gas aftertreatment component to be taken into account when forming the expected value.

The current trend of change of the component temperature, which is not influenced by exothermal reactions and which either increases or decreases the distance to the maximum temperature depending on its algebraic sign, is taken into account by this embodiment. The temperature can be the inlet temperature of the exhaust gas aftertreatment component. A sinking inlet temperature of said exhaust gas aftertreatment component while the regeneration process is in progress means that the exhaust gas mass flow has a cooling effect. A rising inlet temperature means on the other hand that said exhaust gas mass flow has a heating effect.

The temperature can be a temperature within the exhaust gas aftertreatment component. Due to preceding transient operating states, the current temperature can deviate from an equilibrium value, which would arise during a lengthy duration of the present operating state as a result of heat conduction and convection processes which have a balancing effect. In so doing, the current temperature can move away from the equilibrium value or approach said equilibrium value. In taking this effect into account, it is assumed that the direction of this temperature change effect, which results from the previous history of the current operating point, is still maintained for a certain amount of time. It is thereby taken into account that said previous history impresses an offset onto the future temperature profile, which increases or decreases the distance to the threshold value.

By taking this offset and/or the cooling or heating effect into account, the reliability, with which an exceeding of the threshold value can be avoided, is increased without having to maintain undesirably large safety clearances from the threshold value temperature in order to achieve this end. Safety clearances of this type would otherwise increase the frequency of a regeneration not being triggered and/or would more frequently lead to a premature termination of regenerations, which would allow the quality of the exhaust gas aftertreatment to generally decrease.

A preferred embodiment provides for the expected value to be additionally formed as a function of an increase in temperature, which ensues as a result of exothermal reactions after a change from the operating mode set for regeneration to another operating mode.

Said embodiment allows exothermal storage effects to be taken into account. As is explained in more detail further below, the effects of parts, which act to reduce exothermal reactions, on the current exhaust gas mass flow and/or on the storage content of the exhaust gas aftertreatment component can thereby be taken into account.

In conjunction with the subject matter of claim 1, said embodiment allows a comparatively exact prediction of an effect of the regeneration on the temperature, which first arises after said regeneration.

In so doing, said embodiment makes allowance for another effect than the subject matter of claim 1. The subject matter of claim 1 already leads to an improvement in the process control during regeneration processes by avoiding undesired temperature peaks, which result from exothermal regenerations. It is thereby advantageous that this success in avoiding temperature peaks occurs without having to accept undesirably large outliers of the temperature in a downward direction to achieve this objective.

Said embodiment and the embodiments still to be mentioned below further improve on this advantage and therefore allow a regeneration to take place close to an upper threshold temperature of an exhaust gas aftertreatment component also when exothermal reactions occur and also during transient operation.

By predicting the maximum temperature to be expected with an improved degree of accuracy, a clearance of the regeneration operation can then be exactly carried out if it is to be expected that the regeneration can be completed without thermal damage to the component.

If the regeneration has already been initiated after a clearance signal being emitted, one embodiment allows a balancing of all inputs, which lead to a change in temperature during the regeneration operation or at least in temporal connection to a regeneration operation. In so doing, the maximum temperature to be expected after completion of the regeneration operation can be calculated. The probability of the critical temperature being achieved or exceeded is thereby significantly reduced.

The regeneration operation can overall be operated closer to the critical maximum temperature and hence more efficiently by means of the control described above. An unnecessary initiation of said regeneration operation, which then must be terminated before achieving a sufficient regeneration due to temperatures being too high, is avoided in contrast to the technical field. An unnecessarily early termination of said regeneration operation can likewise be avoided. The control described above contributes to a significant improvement in operational safety when NOx storage catalytic converters are regenerated during ongoing projects. Even the more stringent requirements of governmental exhaust gas regulations can be met by an improved stability of the emission control capability of the exhaust gas aftertreatment components.

Further advantages arise from the dependent claims, the description and the accompanying figures.

It goes without saying that the features previously mentioned and those to be subsequently explained can not only be used in the combination presented in each case but also in other combinations or by themselves alone without departing from the scope of the present invention.

BRIEF DESCRIPTION OF THE DRAWINGS

Exemplary embodiments of the invention are depicted in the drawings and are explained in detail in the following description. The following are shown in each case in schematic depiction.

DETAILED DESCRIPTION

Figure 1:
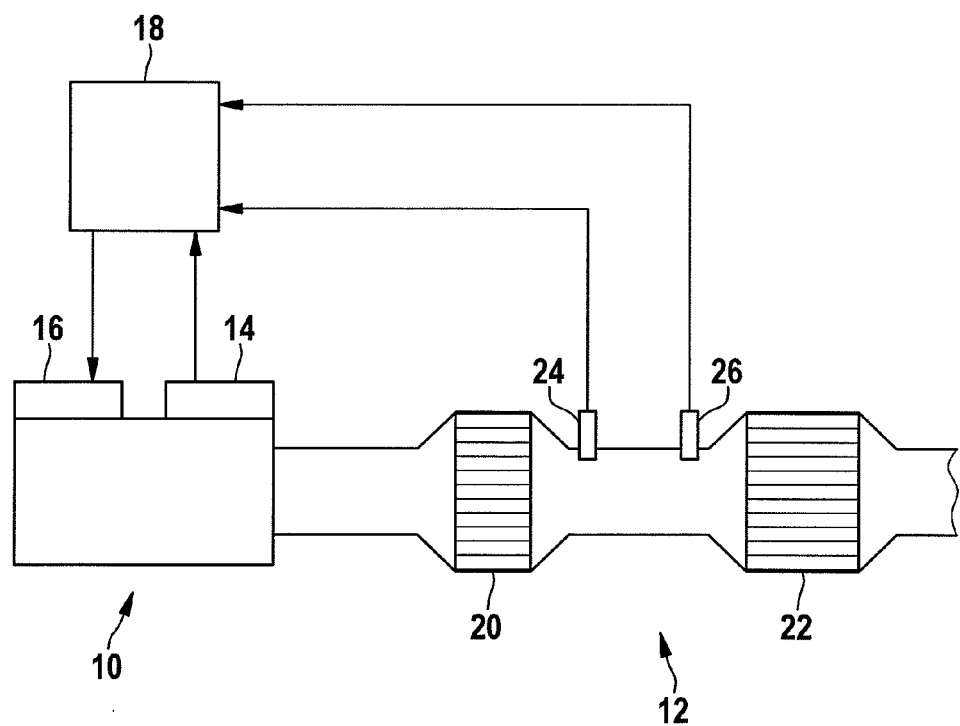
FIG. 1 is the technical environment of the invention.

FIG. 1 shows in detail an internal combustion engine 10 including an exhaust gas system 12, a sensor array 14 for detecting operating parameters of the internal combustion engine, an arrangement 16 of actuators for influencing operating parameters of said internal combustion engine 10 and a control unit 18. In the depicted embodiment, the exhaust gas system 12 comprises an oxidation catalytic converter 20, a NOx storage catalytic converter 22 as well as in each case a temperature sensor 24 and an exhaust gas sensor 26 disposed between the oxidation catalytic converter 20 and the NOx storage catalytic converter 22.

The control unit 18 is set up to process the operating parameters of the internal combustion engine 10 which are detected by the sensor array 14 and the sensors 24 and 26 and thereby to form and emit manipulated variables for activating the arrangement 16 of actuators of said internal combustion engine 10.

The control unit 18 is furthermore set up, particularly programmed, for executing the method according to the invention and/or a plurality of its embodiments. In so doing, the control of the procedural course of events is understood by an execution of the method.

The operating parameters detected by the sensor array include, for example, values of the rotational speed and load of the internal combustion engine. The load is, for example, in this context dependent on a torque request by a driver of the vehicle, and the signals of the temperature sensor 24 and the exhaust gas sensor 26, which in one embodiment is an oxygen sensitive sensor having broadband characteristics that permit an adjustment of different lambda values.

The manipulated variables include particularly variables for influencing the mass and/or composition of combustion chamber contents of the internal combustion engine 10, i.e. particularly manipulated variables for regulating fuel quantity such as injector pulse widths and manipulated variables for regulating air quantity such as signals for influencing a level of throttling and/or a charging pressure and/or an exhaust gas recirculation.

When an operation of the internal combustion engine strictly oriented to torque demands is in effect, the exhaust gas temperature in a diesel motor fluctuates between 150EC in the practically idle-like partial load range at low rpm and values just over 600EC, which are only achieved in the full load range at high rpm.

In order, for example, to carry out a controlled desulfurization of the NOx storage catalytic converter, its temperature must be kept for several minutes in a range above 600EC, a desulfurization additionally requiring a reductive exhaust gas atmosphere.

Figure 2:
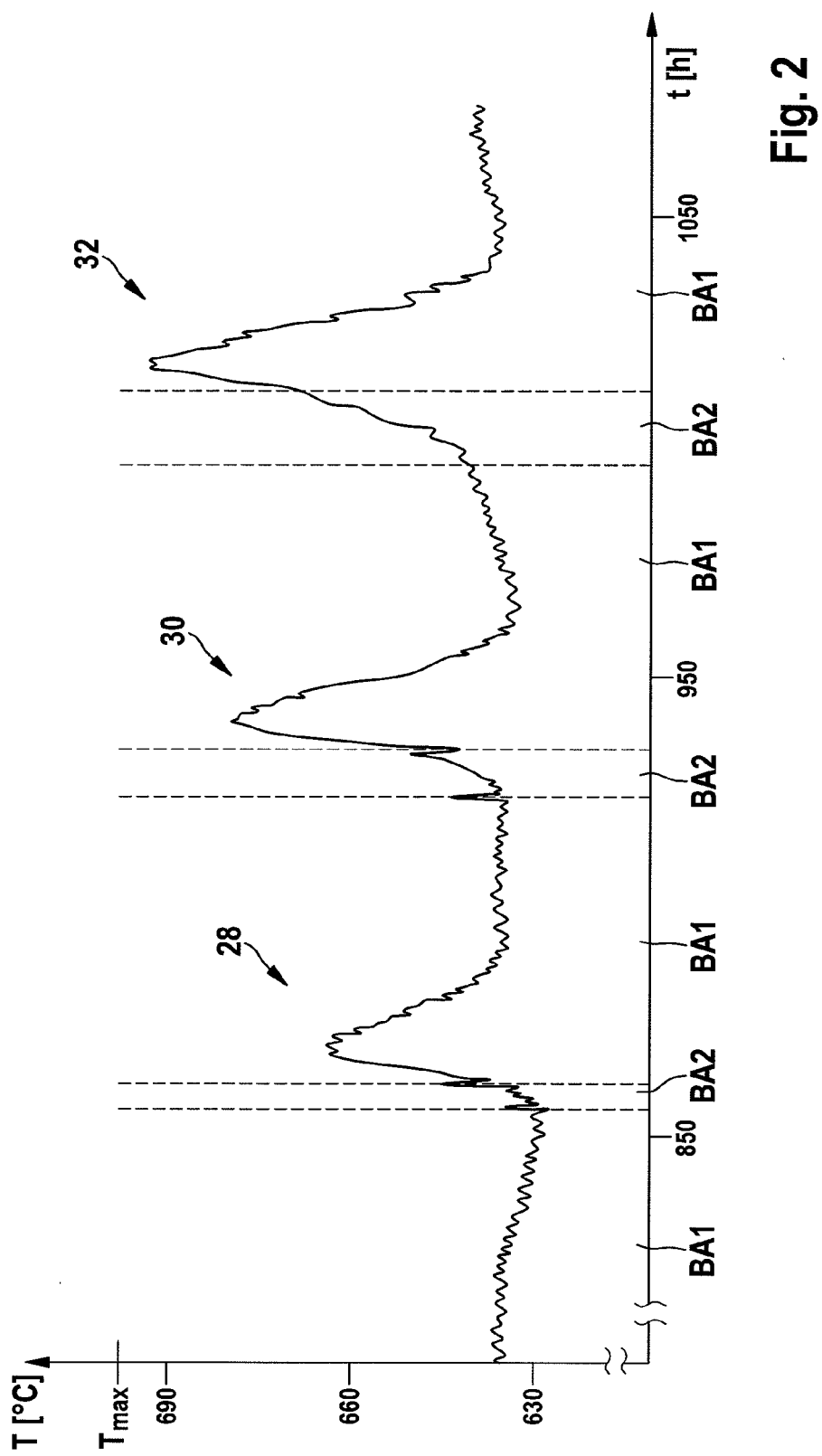
FIG. 2 is a profile of a temperature of a NOx storage catalytic converter during a desulfurization process.

FIG. 2 shows the profile of the temperature of a platinum-containing NOx storage catalytic converter 22 versus the time t during a regeneration carried out for the purpose of desulfurization. The internal combustion engine 10 is a diesel engine in this example. In the process, said internal combustion engine 10 is alternatively operated in a first operating mode BA1 and in a second operating mode BA2. The first operating mode relates to a lean heating operation, which takes place with excess air coefficients (lambda) greater than 1 and which serves to increase the temperature of the catalytic converter. This heating operation is implemented in one embodiment by means of a deliberately induced increase in the exhaust gas temperature. The increase in the exhaust gas temperature is achieved, for example, by a retardation of the fuel injection timing, which diminishes the efficiency of said fuel injection and thereby leads to an increase in the exhaust gas temperature. The second operating mode relates to a rich operation, wherein an operation having a reductive exhaust gas atmosphere with excess air coefficients (lambda) less than 1 is understood. The reductive exhaust gas atmosphere is produced, for example, by a late post-injection, whose fuel mass in the combustion chamber is no longer completely converted. In so doing, the CO content of the exhaust gas amounts, for example, to 2 to 3% with a residual oxygen content of said exhaust gas at, for example, 0.5%.

Three BA2 phases can be seen as well as three temperature pulses 28, 30, 32, which arise from a base temperature level of approximately 630EC to 635EC, in close time proximity to the three BA2 phases. The base temperature level is maintained through the operation in the BA1 phases. The allowed maximum temperature Tmax is in this example 700EC.

Because the storage catalytic converter stores up oxygen in the BA1 phases and the exhaust gas likewise contains residual oxygen in the BA2 phases, an exothermal conversion of the stored oxygen and/or of residual oxygen in the exhaust gas takes place with reductive exhaust gas constituents such as uncombusted fuel, $H_2$ and/or CO during this last mentioned BA2 operating mode. The increase in temperature resulting therefrom occurs in each case during the BA2 operating mode and temporarily after switching into the BA1 operating mode. In the example depicted, the extent of the increase in temperature amounts in total to a maximum of 60EC and brings the temperature of the storage catalytic converter 22 very closely to its allowed maximum temperature of 700EC. Exceeding this temperature would accelerate the ageing of said catalytic converter 22 in an undesirable manner.

Each temperature pulse can be divided into three sections. A first section correlates to the length of the rich operation pulses, i.e. to the time period in which the internal combustion engine 10 is operated in each case in the operating mode BA2, and is characterized by an approximately linear rise, which develops having a first comparatively flat gradient. This is immediately followed by a second section, wherein the temperature initially continues to rise with a comparatively larger gradient at the beginning and then achieves a maximum value with a gradually diminishing gradient. The second section begins in each case with the kink in the temperature profile, which designates the transition from the first flat rise to the second, comparatively steeper rise, and ends in each case at the local maximum. A comparison of the three temperature pulses shows that the temperature input of the second section in each case constitutes approximately a constant 25EC to a 30EC; while the temperature inputs of the first sections are proportional to the length of the first sections. A third section, wherein the temperature drops back approximately to the base temperature level, immediately follows each maximum.

The behavior of the temperature in the first section, that is to say during the operation of the internal combustion engine 10 in the second operating mode BA2 which is also designated as a rich operation, is in each case dominated by exothermal reactions of reductive exhaust gas constituents like CO with residual oxygen in the exhaust gas and oxygen from storage locations of the storage catalytic converter 22.

In the second section, wherein an oxygen excess again prevails in the exhaust gas, the oxygen storage locations of the storage catalytic converter 22 are again occupied with oxygen. This process likewise runs highly exothermally. The almost constant temperature offset results during the exothermally occurring filling of the consistently large oxygen storage capacity of said storage catalytic converter 22.

In the third section, exothermal processes no longer take place and the temperature again falls back to an equilibrium value, which is not influenced by exothermal influences.

During the rich operating phase BA2, the desired regeneration of the storage catalytic converter 22 takes place in a reductive exhaust gas atmosphere.

Similar short phases, which have a reductive exhaust gas atmosphere and have the temperature profile resulting therefrom, occur, for example, as a result of short acceleration processes. The distance of the instantaneous temperature of the storage catalytic converter 22 from its maximally admissible temperature can therefore be comparatively large or comparatively small. Said distance is small, e.g., in the proximity of the maximum of a pulse 28, 30, 32. The first pulse 28 could, e.g., be caused by an acceleration process. If a regeneration pulse, which corresponds to the second temperature pulse 30, would then be triggered at the point in time tE=E850Es, this would obviously lead to an inadmissibly large increase in temperature because the 50EC-increase of the second pulse 30 in combination with the base temperature of approximately 660EC prevailing at the point in time t=850 s would lead to a peak temperature of approximately 710EC and hence to a component temperature which lies above the maximally admissible value of 700EC.

The height of the temperature peaks increases as the duration of the rich operating phases BA2 increases. This is readily apparent in FIG. 2. It would therefore be advantageous to assess the result of the rich operation, which can first be measured after said rich operation occurs, by means of a model prediction and to switch back again in a timely fashion to the uncritical heating operation before the estimated exceedance of the maximum temperature could occur. It would also be advantageous to only switch back to the regeneration operation if the expected duration of the maintenance of said operation is sufficiently long to ensure the desired conversion of the stored material without coming too close to the critical maximum temperature.

An exemplary embodiment of the invention is subsequently explained for the case of a regeneration that has already been triggered while referring to the function block diagram of FIG. 3. In so doing, the blocks correspond in each case to software and/or hardware structures of the control unit 18 set up according to the invention and thereby disclose procedural aspects as well as aspects of the embodiment of the device.

Figure 3:
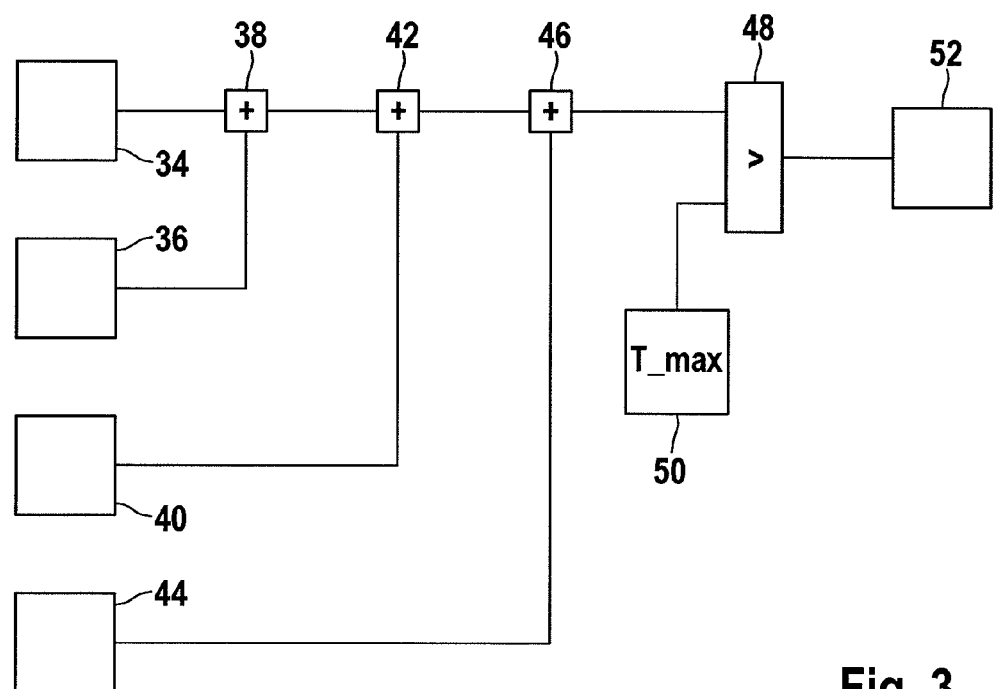
FIG. 3 is an exemplary embodiment of the invention, which relates to a regeneration already in progress.

The maximum temperature to be expected in the storage catalytic converter while a regeneration operation is in progress is calculated using the exemplary embodiment depicted in FIG. 3.

The temperature of the storage catalytic converter 22 prevailing at the point in time when a regeneration thereof is triggered is ascertained in block 34. The temperature of the components is detected at a location or is modeled for a location, whereat the effect of exothermal reactions is completed as fully as possible, i.e. at the end of the catalytic converter. This value is retained at the beginning of the regeneration operation as the starting temperature. In one embodiment the modeling is adjusted by means of a comparison with the signal of the temperature sensor 24 so that the model must only reproduce the influence of processes occurring within the catalytic converter. This temperature forms the base value for the construction of the expected value.

The increase in temperature during the regeneration operation caused by exothermal reactions is continually added to this base value. For this purpose, the integral of the increase in temperature, which is caused by exothermal reactions occurring during said regeneration operation, is continually formed in block 36 during the ongoing regeneration of the catalytic converter. When calculating said integral, the quantity of heat released by exothermal reactions during said regeneration operation is modeled and the change in temperature resulting therefrom is integrated. This is possible with sufficient accuracy particularly in the case of switches into the regeneration operation BA2. Said switches are only required for short time periods in comparison with the thermal inertia of the catalytic converter. In a preferred embodiment, the control unit 18 accesses stored data, which indicate the proportion of reductive exhaust gas constituents in the operating mode BA2 as a function of operating parameters, for the purpose of modeling and integration. The proportion of oxidizing exhaust gas constituents is calculated on the basis of the signal of the exhaust gas sensor 26. The respectively current value of the increase in temperature is added to the base value in the conjunction operator 38.

The described change in temperature, which occurs after the return from the operating mode BA2 to the operating mode BA1, is additionally added. The temperature offset to be expected as a result of storage effects after a return from the operating mode BA2 to the operating mode BA1 is modeled in block 40. As has been pointed out earlier, said temperature offset relates to an offset dependent upon the oxygen storage capacity and is thereby substantially constant. This offset is added in the conjunction operator 42.

Changes in temperature due to changes of the operating point of the internal combustion engine are taken into account by the measured or modeled inlet temperature of the components being retained at the beginning of the regeneration operation. Changes in the inlet temperature with respect to this value are added as a further input in order to take convective influences into consideration. The inlet temperature thereby corresponds to the value acquired by the temperature sensor 24. A modeling of the cooling or heating effects of the exhaust gas mass flow through the storage catalytic converter 22 takes place in block 44 for the purpose of taking said changes in the inlet temperature into account. In addition, a difference is continually formed between the current inlet temperature and the inlet temperature stored in block 34 at the point in time of the beginning of the regeneration resulting from the change to the operating mode BA2. An inlet temperature which drops with time signals a cooling effect of the exhaust gas mass flow, whereas a temperature increasing with time signals a heating effect. A corrective input, which in each case takes this effect into account, is formed in block 44 and this corrective input is additively concatenated with the rest of the temperature inputs.

The value of the temperature resulting at the output port of the conjunction operator 46 is an expected value, which is derived from the temperature profile prevailing up until now while taking into account future exothermal storage effects and convective influences of the exhaust gas mass flow. This expected value is compared in block 48 with a threshold value T_max, which is supplied by block 50 and still lies below the maximum temperature that is to be avoided. If the threshold is broken, the operating mode BA2 is terminated at a point in time, whereat the succeeding increase in temperature, which is based on the storage effects, does not yet lead to the maximally admissible value Tmax being exceeded. In other words: If the expected value calculated in this manner exceeds the threshold value, the regeneration operation is discontinued.

By taking all of the heat inputs into the system into account up until having left the regeneration operation, the allowed maximum temperature can no longer be exceeded after discontinuing said regeneration operation.

In the case of processes, in which the regeneration operation must be maintained for a longer time, the influence of convection on the increase in temperature, which occurs due to exothermal reactions, becomes relevant. In the case of this happening, the invention provides in another embodiment for the temperature input from the exothermal reaction to receive an additional term, which takes the dissipation of heat through convection into consideration.

Figure 4:
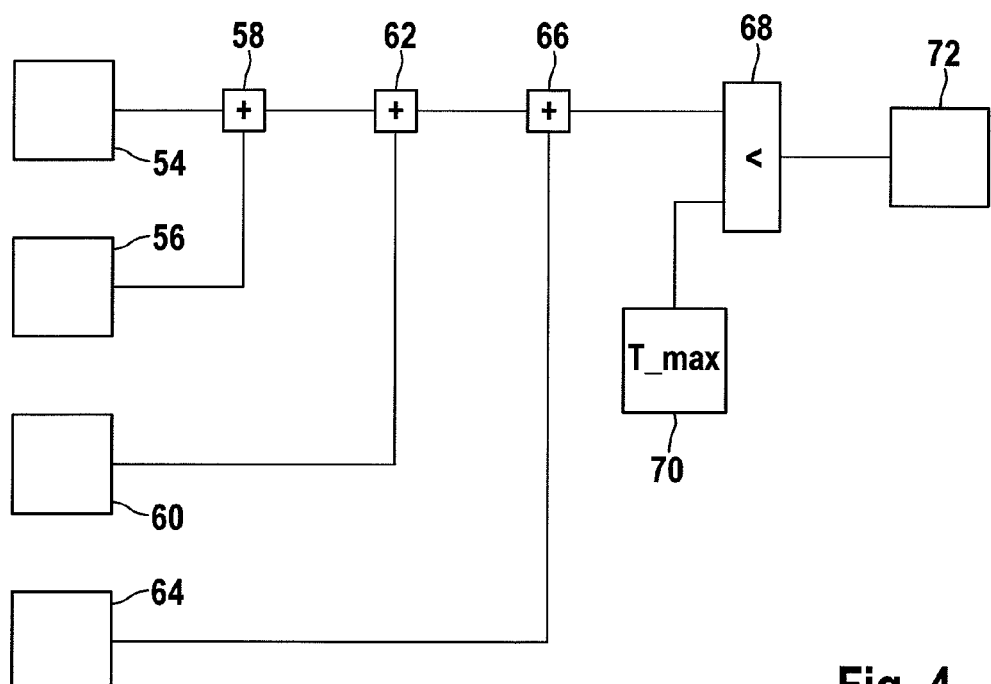
FIG. 4 is an exemplary embodiment of the invention, which relates to an assessment of a planned but not yet initiated regeneration.

Whereas FIG. 3 relates to a decision whether to discontinue a BA2 phase already in progress, FIG. 4 shows an exemplary embodiment for the case of a decision whether to trigger a transition from the operating mode BA1 into the operating mode BA2, that is to say whether to trigger a transition from a heating operation with an oxidizing exhaust gas atmosphere into a rich operation with a reductive exhaust gas atmosphere.

The temperature of the storage catalytic converter 22 is continuously acquired in block 54 by detecting the signal of the temperature sensor 24. An increase in temperature to be expected is calculated in step 56 on the basis of a regeneration operation in the operating mode BA2 while assuming a predefined minimum duration for the rich operating phase of the regeneration. The minimum duration is preferably measured such that a discharge of significant amounts of stored sulfur takes place in addition to a discharge of oxygen from said storage catalytic converter 22. Such a discharge of sulfur first occurs with a certain amount of delay with respect to the discharge of oxygen, which proves that short rich operating phases, which have to be discontinued due to temperature, are inefficient on account of the fuel consumption connected to each rich operation.

Said minimum duration correlates with a minimum value for the increase in temperature resulting therefrom. This fictitious minimum value, which can be expected at the current point in time, is added in the conjunction operator 58 to the base value supplied by block 54. An increase in temperature to be expected on account of storage effects after a return from the operating mode BA2 to the operating mode BA1 is modeled in step 60. In this respect, block 60 corresponds to block 40 from FIG. 3. An additive conjunction of this temperature input with further temperature inputs occurs in block 62.

A direction of change of a current temperature of the storage catalytic converter 22 is ascertained in block 64. In a preferred embodiment, this takes place by forming and evaluating a time derivative of a current temperature of said storage catalytic converter. The current temperature preferably relates to a value, which also takes exothermal effects into account and which is calculated in a similar fashion to the temperature inputs of blocks 36 and 40 from FIG. 3.

Temperature inputs can thereby be taken into account, which ensue from recent transient operating states, wherein exothermal and/or convective temperature inputs have occurred. The current temperature then returns to an equilibrium value, which can mean a positive or negative input for the formation of the expected value. This input is concatenated with the rest of the temperature inputs by the conjunction operator 66.

The sum of the inputs supplied by the blocks 54, 56, 60 and 64 forms the expected value for the temperature maximum of a planned but not yet triggered regeneration. In block 68, said expected value is compared with a maximum value T_max provided by block 70. Only if the maximum value T_max is not exceeded is the regeneration cleared to proceed in block 72.

In the exemplary embodiment of FIG. 4, that quantity of heat is calculated as a function of the current operating state of the internal combustion engine, which is released during the regeneration operation by exothermal reactions in a period of time, which is at least required for a desired successful regeneration. In order to calculate the expected temperature of the components after this minimum time period has elapsed, the change in temperature due to the change in the operating state of the internal combustion engine which has already taken place, that is to say due to the transient operation of said internal combustion engine, continues to be taken into account. This is achieved by taking the time derivative of the instantaneous temperature into account. Furthermore, the proportion of the change in temperature is taken into account, which ensues from the change in the operating state from the instantaneous operating mode to the regeneration operation and from the change from said regeneration operation back into said instantaneous operating mode. If the expected value resulting therefrom remains below a maximally allowed temperature, said regeneration operation is requested/cleared for initiation.

The invention was described extensively with reference to a NOx storage catalytic converter as the exhaust gas aftertreatment component. It, however, goes without saying that the invention can be used in combination with other exhaust gas aftertreatment components, in whose case all of or a portion of the temperature effects occur, which are described in reference to FIG. 2. Hence, all of the effects occur in the case of three-way catalytic converters and/or oxidation catalytic converters, which have an oxygen storage capability and which, as the case may be, need likewise to be desulfurized from time to time. A portion of the effects also occur in soot particle filters. These, however, do not show the pronounced increase in temperature after a return from the phase having a reductive exhaust gas atmosphere to the phase with an oxidizing exhaust gas atmosphere because soot particle filters do not have a pronounced oxygen storage capability.

The invention claimed is:

1. A system comprising:
an internal combustion engine having an arrangement of actuators, the engine including an exhaust gas system having an exhaust gas aftertreatment component that temporarily stores exhaust gas constituents and can be regenerated; and
a control unit configured for controlling the internal combustion engine, the control unit configured to:
during a regeneration of said exhaust gas aftertreatment component, form an expected value for a temperature of the exhaust gas aftertreatment component as a function of an increase in a temperature of the exhaust gas aftertreatment component which arises as a result of exothermal reactions during the duration of an operating mode of the internal combustion engine;
compare the expected value with an upper threshold value; and
change the control of said internal combustion engine by operating the arrangement of actuators when the threshold value is exceeded such that the expected value formed while taking the changed control into account does not exceed said threshold value,
wherein said control unit is further configured to take a direction of change of a current temperature of said exhaust gas aftertreatment component into account when forming said expected value, and
wherein the expected value is additionally formed as a function of an increase in temperature, which arises as a result of exothermal reactions after a change from the operating mode set for the regeneration operation to another operating mode.

2. A method for controlling an internal combustion engine, comprising:
during a regeneration of an exhaust gas aftertreatment component, forming an expected value for a temperature of the exhaust gas aftertreatment component as a function of an increase in a temperature of the exhaust gas aftertreatment component,
wherein the exhaust gas aftertreatment component temporarily stores exhaust gas constituents and the exhaust gas aftertreatment can be regenerated, and
wherein the increase in temperature arises as a result of exothermal reactions during the duration of an operating mode of the internal combustion engine;
comparing the expected value with an upper threshold value; and
changing the control of the internal combustion engine by operating an arrangement of actuators when the threshold value is exceeded, such that the expected value formed while taking the changed control into account does not exceed said threshold value,
wherein the expected value is additionally formed by accounting for a direction of change of a current temperature of the exhaust gas aftertreatment component, and wherein the expected value is additionally formed as a function of an increase in temperature, which arises as a result of exothermal reactions after a change from the operating mode set for the regeneration operation to another operating mode.

3. The method according to claim 2, wherein the expected value is additionally formed prior to a triggering of a regeneration and a change of the operating mode of the internal combustion engine, and
wherein the triggering is not initiated when the threshold value is exceeded.

4. The method according to claim 3, wherein a time derivative of a current temperature of the exhaust gas aftertreatment component is used to take the direction of change and the speed of change into account.

5. The method according to claim 2, wherein the expected value is additionally formed while a regeneration is in progress and the regeneration in progress is discontinued by a change of the operating mode.

6. The method according to claim 2, wherein a minimum period of time for the operating mode, which is set for the regeneration operation, is presupposed and the increase in temperature for this minimum period of time is formed.

7. A method for controlling an internal combustion engine, comprising:
during a regeneration of an exhaust gas aftertreatment component, forming an expected value for a temperature of the exhaust gas aftertreatment component as a function of an increase in a temperature,
wherein the exhaust gas aftertreatment component temporarily stores exhaust as constituents and the exhaust as aftertreatment can be regenerated, and
wherein the increase in temperature arises as a result of exothermal reactions during the duration of an operating mode of the internal combustion engine;
comparing the expected value with an upper threshold value; and
changing the control of the internal combustion engine by operating an arrangement of actuators when the threshold value is exceeded such that the expected value does not exceed the threshold value,
wherein the expected value is additionally formed by accounting for a direction of change of a current temperature of the exhaust as aftertreatment component,
wherein the expected value is additionally formed as a function of an increase in temperature, which arises as a result of exothermal reactions after a changing from the operating mode set for the regeneration operation to another operating mode,
wherein the expected value is additionally formed while the regeneration is in progress is being discontinued by a change of the operating mode, and
wherein a difference between a current inlet temperature of the exhaust gas aftertreatment component and an inlet temperature of said exhaust gas aftertreatment component at the point in time of the triggering of the regeneration is used to take the direction of change and the speed of change into account.

* * * * *